United States Patent

Liaw et al.

[19]

[11] Patent Number: 6,097,316
[45] Date of Patent: Aug. 1, 2000

[54] COMMUNICATION PROTOCOL FOR A VEHICLE NAVIGATION SYSTEM

[75] Inventors: Jeff Liaw, San Jose; Hiroshi Nonaka, Cupertino, both of Calif.

[73] Assignee: Visteon Technologies, LLC, Sunnyvale, Calif.

[21] Appl. No.: 09/063,570

[22] Filed: Apr. 20, 1998

[51] Int. Cl.[7] .................................................. G08G 1/123
[52] U.S. Cl. ........................... 340/988; 340/995; 701/23; 701/36; 701/200; 701/213
[58] Field of Search .................... 340/988, 995; 701/23, 24, 26, 36, 200, 213

[56] References Cited

U.S. PATENT DOCUMENTS

| | | | |
|---|---|---|---|
| 3,845,289 | 10/1974 | French | 235/151.2 |
| 4,570,227 | 2/1986 | Tachi et al. | 364/444 |
| 4,608,656 | 8/1986 | Tanaka et al. | 364/449 |
| 4,611,293 | 9/1986 | Hatch et al. | 364/571 |
| 4,672,565 | 6/1987 | Kuno et al. | 364/571 |
| 4,673,878 | 6/1987 | Tsushima et al. | 324/226 |
| 4,723,219 | 2/1988 | Haseba et al. | 364/449 |
| 4,734,863 | 3/1988 | Honey et al. | 364/449 |
| 4,751,512 | 6/1988 | Longaker | 342/357 |
| 4,782,447 | 11/1988 | Ueno et al. | 364/449 |
| 4,796,191 | 1/1989 | Honey et al. | 364/450 |
| 4,797,841 | 1/1989 | Hatch | 364/571.04 |
| 4,831,563 | 5/1989 | Ando et al. | 364/571.05 |
| 4,862,398 | 8/1989 | Shimizu et al. | 364/571.05 |
| 4,914,605 | 4/1990 | Loughmiller, Jr. et al. | 364/518 |
| 4,918,609 | 4/1990 | Yamawaki | 364/449 |
| 4,926,336 | 5/1990 | Yamada | 364/444 |
| 4,937,753 | 6/1990 | Yamada | 364/449 |
| 4,956,777 | 9/1990 | Cearley et al. | 364/424.02 |
| 4,964,052 | 10/1990 | Ohe | 364/449 |
| 4,970,652 | 11/1990 | Nagashima | 364/449 |
| 4,982,332 | 1/1991 | Saito et al. | 364/449 |
| 4,984,168 | 1/1991 | Neukrichner et al. | 364/449 |
| 4,989,151 | 1/1991 | Nuimura | 364/449 |
| 4,992,947 | 2/1991 | Nimura et al. | 364/444 |
| 4,996,645 | 2/1991 | Schneyderberg Van DerZon | 364/449 |
| 4,999,783 | 3/1991 | Tenmoku et al. | 364/450 |
| 5,040,122 | 8/1991 | Neukirchner et al. | 364/449 |
| 5,046,011 | 9/1991 | Kakihara et al. | 364/449 |
| 5,060,162 | 10/1991 | Ueyama et al. | 364/449 |
| 5,170,352 | 12/1992 | McTamaney et al. | 364/424.02 |
| 5,177,685 | 1/1993 | Davis et al. | 364/443 |
| 5,272,638 | 12/1993 | Martin et al. | 364/444 |
| 5,283,743 | 2/1994 | Odagawa | 364/457 |
| 5,287,297 | 2/1994 | Ihara et al. | 364/571.02 |
| 5,297,050 | 3/1994 | Ichimura et al. | 364/444 |
| 5,369,588 | 11/1994 | Hayami et al. | 364/449 |
| 5,410,485 | 4/1995 | Ichikawa | 364/444 |
| 5,412,573 | 5/1995 | Barnea et al. | 364/449 |
| 5,463,554 | 10/1995 | Araki et al. | 364/444 |
| 5,486,822 | 1/1996 | Tenmoku et al. | 340/995 |
| 5,506,774 | 4/1996 | Nobe et al. | 364/424.05 |
| 5,513,110 | 4/1996 | Fujita et al. | 364/449 |
| 5,519,619 | 5/1996 | Seda | 364/444 |
| 5,521,826 | 5/1996 | Matsumoto | 364/449 |
| 5,845,226 | 12/1998 | Ajima | 701/208 |

FOREIGN PATENT DOCUMENTS

| | | |
|---|---|---|
| 0 485 120 A2 | 5/1992 | European Pat. Off. . |
| 0 575 943 1 | 12/1993 | European Pat. Off. . |
| 0 770 979 A1 | 5/1997 | European Pat. Off. . |
| 2 271 423 | 4/1994 | United Kingdom . |

OTHER PUBLICATIONS

French, *MAP matching Origins Approaches and Applications*, Rober L. French & Associates, 3815 Lisbon St., Suite 201, Fort Worth, Texas 76107, USA, pp. 91–116.

*Primary Examiner*—Nina Tong
*Attorney, Agent, or Firm*—Beyer Weaver & Thomas, LLP

[57] ABSTRACT

A method for transmitting data from a navigation system to a vehicle controller in a vehicle having a plurality of systems controlled by the vehicle controller is described. The plurality of systems includes a user interface and the navigation system. A request is received from the vehicle controller for interface data of a particular data type to be presented in the user interface. A first transmission protocol is selected from a plurality of transmission protocols for transmitting the interface data to the vehicle controller. The first transmission protocol is selected based, at least in part, on the data type of the interface data. The interface data are then transmitted to the vehicle controller according to the first transmission protocol.

27 Claims, 6 Drawing Sheets

COMMUNICATION PROTOCOL FOR A VEHICLE NAVIGATION SYSTEM

BACKGROUND OF THE INVENTION

The present invention relates to data transmission in a vehicle navigation system. More specifically, the present invention provides a protocol for transmitting data between a navigation computer and a vehicle controller which controls a variety of vehicle systems including a user interface by which a user interacts with the navigation computer.

Figure 1:
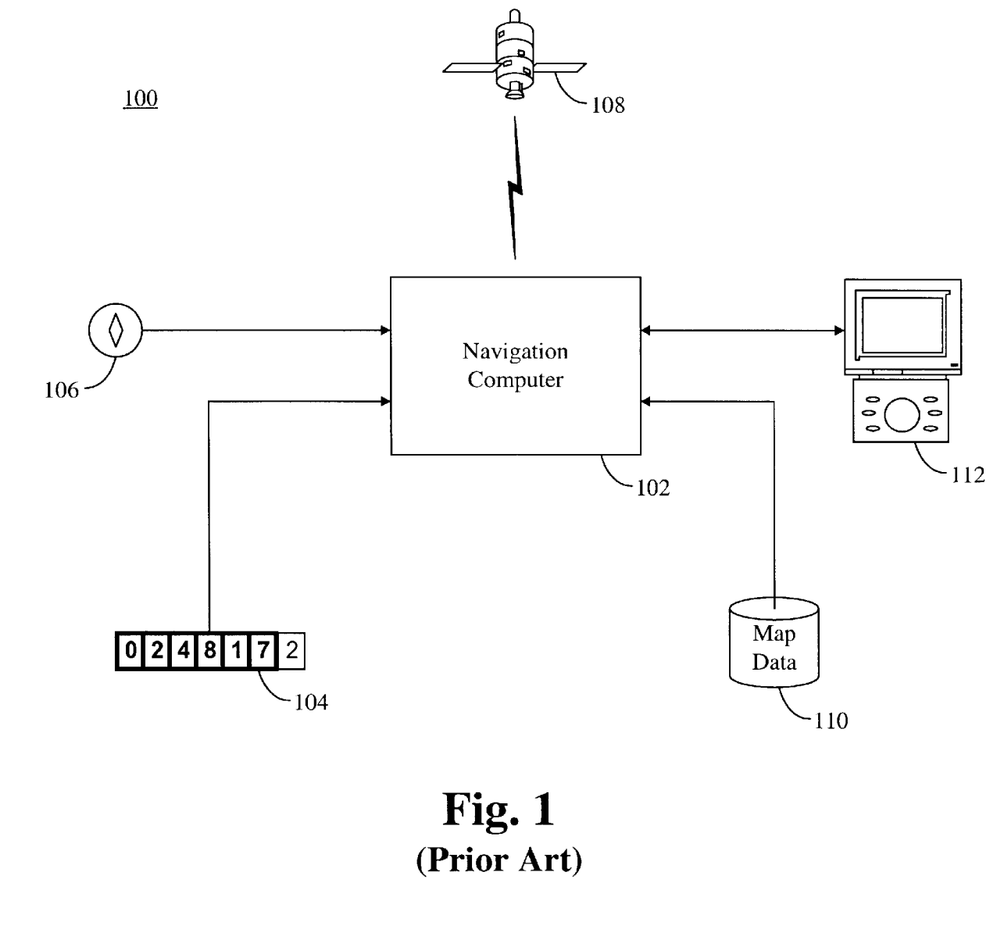
FIG. 1 is a block diagram of a vehicle navigation system designed according to the prior art.

There are currently a wide variety of commercially available on-board navigation systems for automobiles the majority of which are substantially self-contained. That is, most of today's systems are largely separate from the vehicle's systems requiring only input from the vehicle's odometer. All other functions of such navigation systems, including those of the user interface, are performed independent of the vehicle's other system. FIG. 1 is a block diagram of a vehicle navigation system 100 designed according to the prior art. A navigation computer 102 receives input from the vehicle's odometer 104, a gyroscope 106, and a global positioning satellite system represented by satellite 108. Navigation computer 102 uses this input along with digitized map data in a database medium 110 to perform navigational functions such as route calculation and guidance. Navigation system 100 interacts with a user via user interface 112 which typically includes a display screen and some sort of keypad for user input. When a user enters a command via interface 112 which requests, for example, that a list of cities be displayed, navigation computer 102 typically loads the entire list from database 110 into its local memory (not shown) and then transmits the list to the display as the user scrolls through it. This is done regardless of the size of the list because the transmission between computer 102 and interface 112 is typically the limiting part of the data transfer path. It is expected by many in the vehicle navigation industry that trends in automobile design will soon render this design paradigm obsolete.

As automobile design progresses, the control mechanisms for the various vehicle systems are becoming increasing sophisticated. Individual microprocessors and controllers currently play an important role in the operation of and the interaction between most electrical and mechanical vehicle systems. It is envisioned that the operation and interaction of substantially all vehicle systems will eventually be controlled by a single central controller. It is also envisioned that a sophisticated user interface having a display and some sort of keypad will be provided by which the user of the vehicle may configure various vehicle systems.

The advent of such a control Environment in automobiles of the future will of course necessitate a change in the nature of vehicle navigation system design. For example, most navigation systems available today have a dedicated user interface with a display and some sort of input device. However, in the vehicle of the future described above, such a user interface would be duplicative of the vehicle's interface. Also, because the vehicle of the future will control most vehicle functions with a central controller, it is likely that at least some input information going to the navigation system will come through the central controller. Thus, some sort of interface with the central controller will probably be necessary.

Moreover, because current navigation systems are largely self-contained, when such systems display a list of cities or streets in the user interface, the entire list is typically retrieved from the map database and stored in local memory even though only a relatively small portion of the list may be shown at any one time. This would obviously not be appropriate for a navigation system which interacts with the user interface through an external controller. That is, the central controller could not allow its memory to be consumed in this way because of the memory demands associated with other systems under the controller's purview. In addition, if the central controller had to wait for a list of all the street names in a large metropolitan area to be downloaded from the navigation system before displaying the list, the delay would be unacceptable from a marketability perspective.

Finally, given the complexity of the control environment of the vehicle of the future, it simply makes sense to bring the operation of the navigation system at least partially under the control of the vehicle's central controller.

It is therefore desirable to provide a vehicle navigation system which is operable to interact with the vehicle's user interface and other systems via the vehicle's central controller.

SUMMARY OF THE INVENTION

According to the present invention, a vehicle navigation system is provided which interacts with the vehicle's control environment through the vehicle's central controller. The navigation system controls the manner in which it transmits data to the vehicle controller according to the type of data being transmitted and/or the request from the vehicle controller. Because the manner in which information is transmitted is related to the information itself, the information is transmitted appropriately and efficiently. For example, where the central controller requests a list of cities for presenting to a user on the display, the navigation system initially transmits a series of contiguous data packets which have enough of the requested city list to fill the display. Thereafter, additional data packets are sent representing the next entries on the list, or some other subset of the list as requested by the user. All of this is transparent to the user who scrolls through the displayed list as though directly from local memory.

By contrast, where the information transmitted is, for example, a graphic screen, all of the content associated with the screen must be available for display simultaneously. Therefore, according to one embodiment, the navigation system compresses the screen data for transmission across the data link to the central controller. This may be done according to any of a wide variety of data compression techniques. According to another embodiment, a plurality of generic graphic screens are stored in memory associated with the central controller each of which is uniquely identified by a screen identification (ID) string. When a specific instance of the generic screen is to be displayed in the user interface, the navigation system transmits the appropriate ID string along with additional data which is combined with the generic screen by the central controller to create the instance for display.

Thus, according to the invention, a method and apparatus are provided for transmitting data from a navigation system to a vehicle controller in a vehicle having a plurality of systems controlled by the vehicle controller. The plurality of systems includes a user interface and the navigation system. A request is received from the vehicle controller for interface data of a particular type to be presented in the user interface. A first transmission protocol is selected from a plurality of transmission protocols for transmitting the interface data to the vehicle controller. The first transmission protocol is selected based, at least in part, on the data type of the interface data. The interface data are then transmitted to the vehicle controller according to the first transmission protocol. According to a specific embodiment, the first transmission protocol is selected based in part on the nature of the request received from the vehicle controller.

A further understanding of the nature and advantages of the present invention may be realized by reference to the remaining portions of the specification and the drawings.

DESCRIPTION OF SPECIFIC EMBODIMENTS

Figure 2:
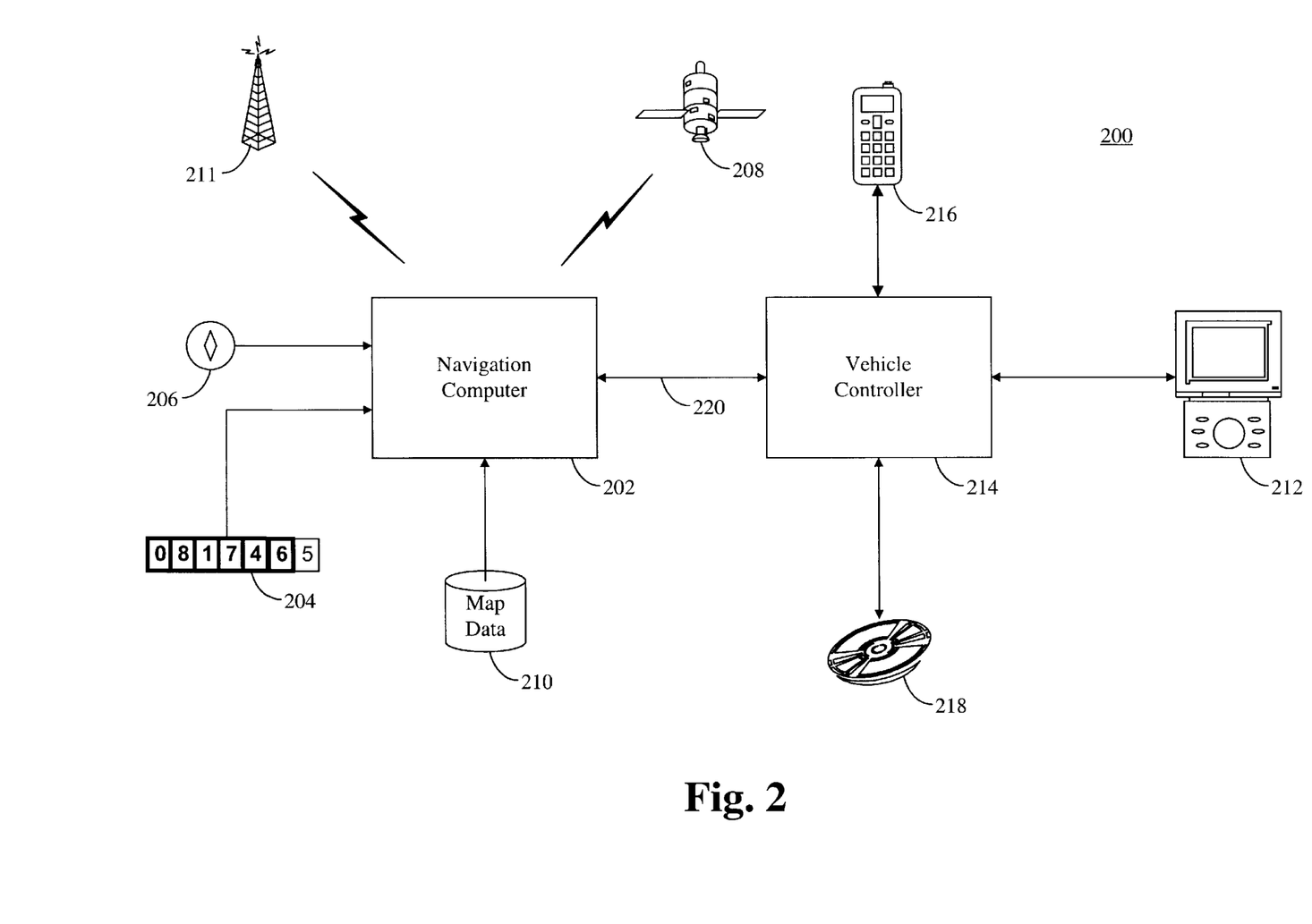
FIG. 2 is a block diagram of a vehicle environment including a navigation system designed according to a specific embodiment of the invention.

FIG. 2 is a block diagram of a vehicle environment 200 including a navigation computer 202 designed according to a specific embodiment of the invention. As discussed above with reference to FIG. 1, navigation computer 202 receives input from a variety of sources including odometer 204, gyroscope 206, GPS satellite 208, and map database medium 210 for the purpose of performing navigation functions such as route calculation and guidance. According to specific embodiments, navigation computer 202 may also be configured to receive broadcast traffic data (represented by radio tower 211) for use in route calculation and guidance. Vehicle environment 200 also includes a vehicle controller 214 which controls cellular phone 216, the vehicle's audio system 218 (as represented by the compact disc), and a user interface 212 which allows a user to configure the various systems controlled by vehicle controller 214.

Navigation computer 202 communicates with and is, at least in part, controlled by vehicle controller 214 via communication link 220. According to various embodiments, communication link 220 may comprises a serial or a parallel data link. Because of transmission bandwidth and memory constraints, it is undesirable for navigation computer 202 to transmit data for display in the manner described above with reference to navigation computer 102. That is, it is impracticable to transmit an entire list of cities or street names from database 210 to vehicle controller 214 before the list is displayed both because an unacceptable delay would be experienced by the user due to the duration of the transfer, and because a considerable amount of the vehicle controller's memory would be consumed thereby potentially interfering with its control of other vehicle systems. Moreover, because of the amount of data associated with graphics screens, e.g., maneuver screens, it may also be impracticable to transmit entire graphics screens between navigation computer 202 and vehicle controller 204 depending upon the capacities of the vehicle controller. Therefore, as discussed below with reference to FIGS. 5 and 6, navigation computer 202 transmits data to vehicle controller 214 via communication link 220 according to different transmission protocols which are dependent upon the type of data being transferred.

Figure 3:
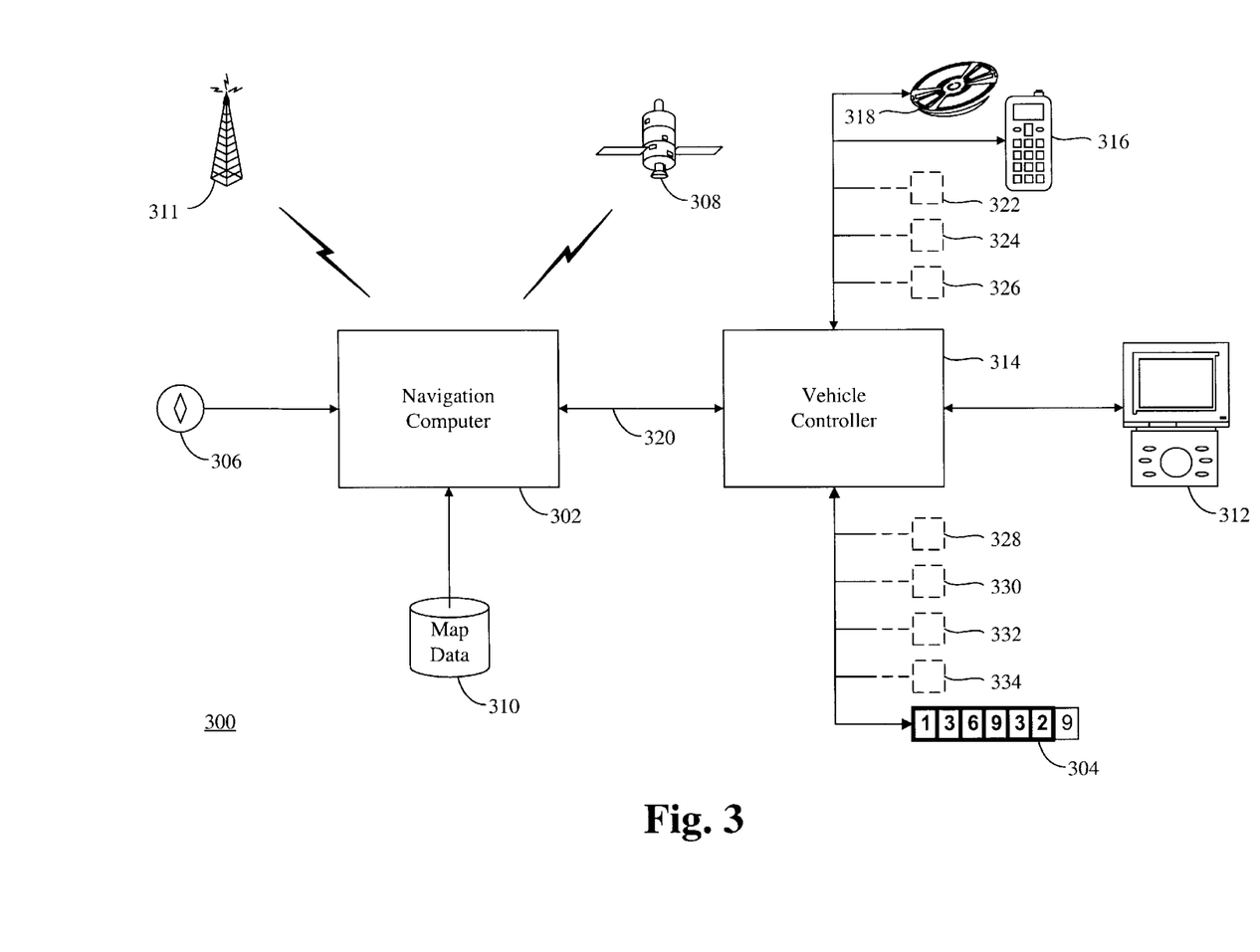
FIG. 3 is a block diagram of a vehicle environment including a navigation system designed according to another specific embodiment of the invention.

FIG. 3 is a block diagram of a vehicle environment 300 including a navigation system 302 designed according to another specific embodiment of the invention. Vehicle environment 300 envisions a more sophisticated control environment than environment 200 in that its vehicle controller 314 controls most of the vehicle systems including some which provide input to navigation computer 302, e.g., odometer 304. As discussed above with reference to FIGS. 1 and 2, navigation computer 302 receives input from a variety of sources including odometer 304, gyroscope 306, GPS satellite 308, and map database medium 310 for the purpose of performing navigation functions such as route calculation and guidance.

As with navigation computer 202, navigation computer 302 may also be configured to receive broadcast traffic data (represented by radio tower 311) for route calculation and guidance. Vehicle controller 314 controls cellular phone 316, the vehicle's audio system 318, user interface 312, odometer 304, and most of the vehicle's other systems 322–334 including, for example, the fuel system, the ignition system, the transmission, suspension, drive system, braking system, and cabin environmental system. Navigation computer 302 communicates with and is, at least in part, controlled by vehicle controller 314 via communication link 320. As discussed above with reference to navigation computer 202 and below with reference to FIGS. 5 and 6, navigation computer 302 transmits data to vehicle controller 314 according to different transmission protocols which are dependent upon the type of data being transferred.

Figure 4:
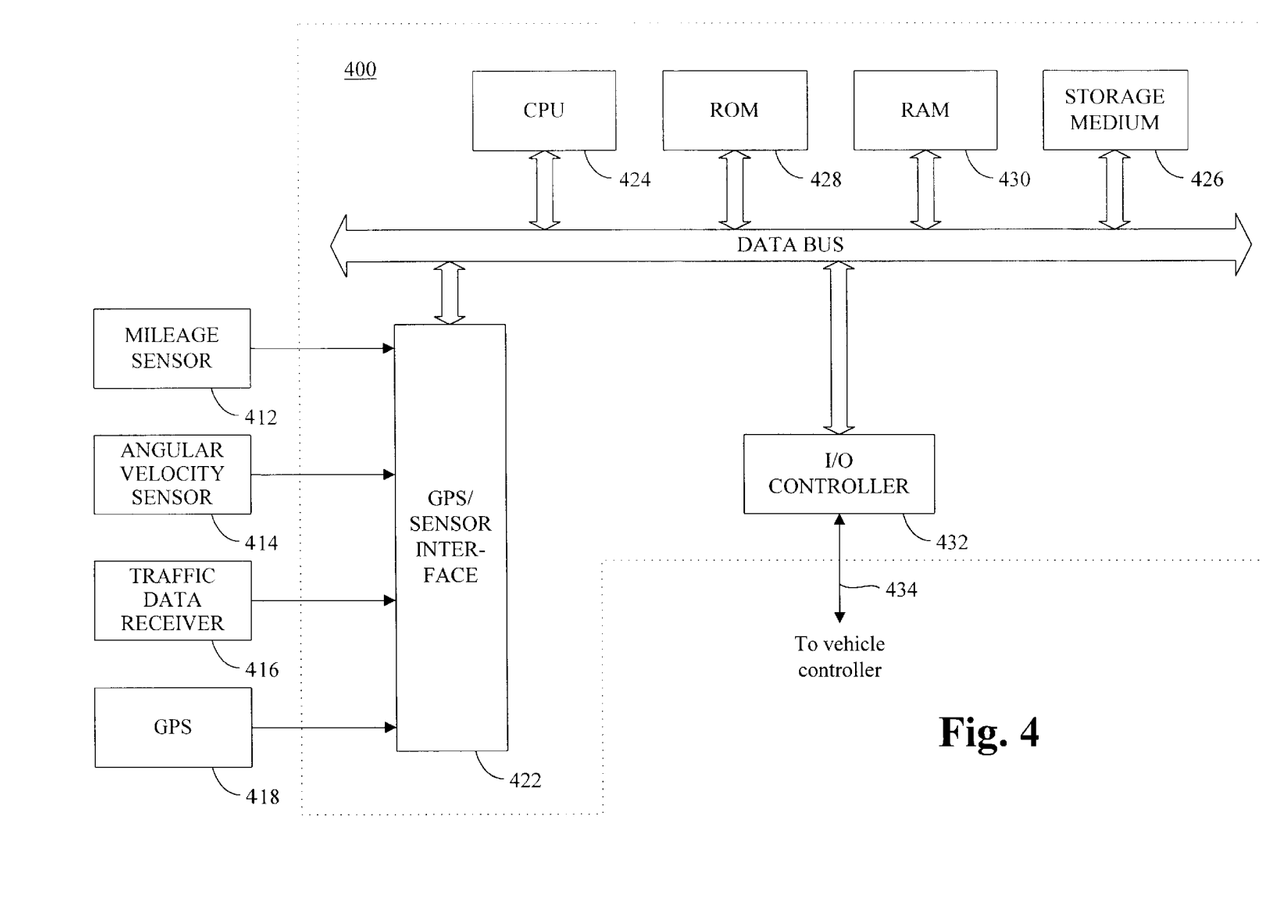
FIG. 4 is a block diagram of a navigation computer which may be employed with various embodiments of the invention.

FIG. 4 is a block diagram of a navigation computer 400 which may be employed with various embodiments of the invention. Sensors 412 and 414, traffic data receiver 416, and GPS receiver 418 are coupled to navigation computer 400 through sensor/GPS interface 422. In tropical embodiments, mileage sensor 412 comprises an odometer, and angular velocity sensor 414 comprises a gyroscope, or a differential odometer coupled to the wheels of the vehicle. Traffic data receiver 416 may comprise any of a wide variety of RF receivers which are operable to receive real time traffic data transmitted in a variety of formats. A global positioning system (GPS) data receiver 418 is provided for receiving signals from, for example, a satellite-based navigation system. Data from sensor/GPS interface 422 is transmitted to CPU 424, which performs calibration, signal processing, dead-reckoning, vehicle positioning, and route calculation and guidance functions. A database containing map information may be stored in database medium 426, with software directing the operation of navigation computer 400 stored in main memory 428 for execution by CPU 424. Memory 428 may comprise any of a wide variety of non-volatile memory such as, for example, read-only memory (ROM), reprogrammable non-volatile memory such as flash memory or SRAM, CD ROM, optical disk, or PCMCIA cards. System RAM 430 permits reading and writing of the information necessary to execute such software programs. Database medium 426 may comprise non-volatile memory, a hard disk drive, CD-ROM, or an integrated circuit in which digitized map information has been stored. I/O controller 432 receives data processed by CPU 424 and transmits the data to the vehicle controller (not shown) via communication link 434. The vehicle controller communicates with navigation computer 400 via communication link 434 and I/O controller 432.

The map database stored in database medium 426 preferably comprises positional data such as, for example, latitude and longitude coordinates, to describe road intersections or nodes, road segments, landmarks and points of interest, and other geographical information. The data base may further comprise data representing characteristics of roads or places on the map, such as road and place names, road features such as dividers, one-way restrictions, surface, speed limit, shape, elevation, and other properties. According to specific embodiments of the invention, the map database includes cost values associated with individual nodes and road segments. These cost values correspond to the estimates of time intervals for traversing the respective node or segment. Node cost values take into consideration such information as, for example, whether the vehicle would encounter oncoming traffic, thus delaying a left turn maneuver. Segment costs reflect road segment characteristics such as speed limit and segment length, both of which affect the travel time along the segment. Also associated with each road in the map database is a hierarchy value which relates to the category or type of the road. For example, the highest level category of the hierarchy includes freeways and expressways. The lowest level includes residential streets and/or alleys. The information stored in map database medium 426 is employed with the data received from interface 422 for route calculation and guidance.

Figure 5:
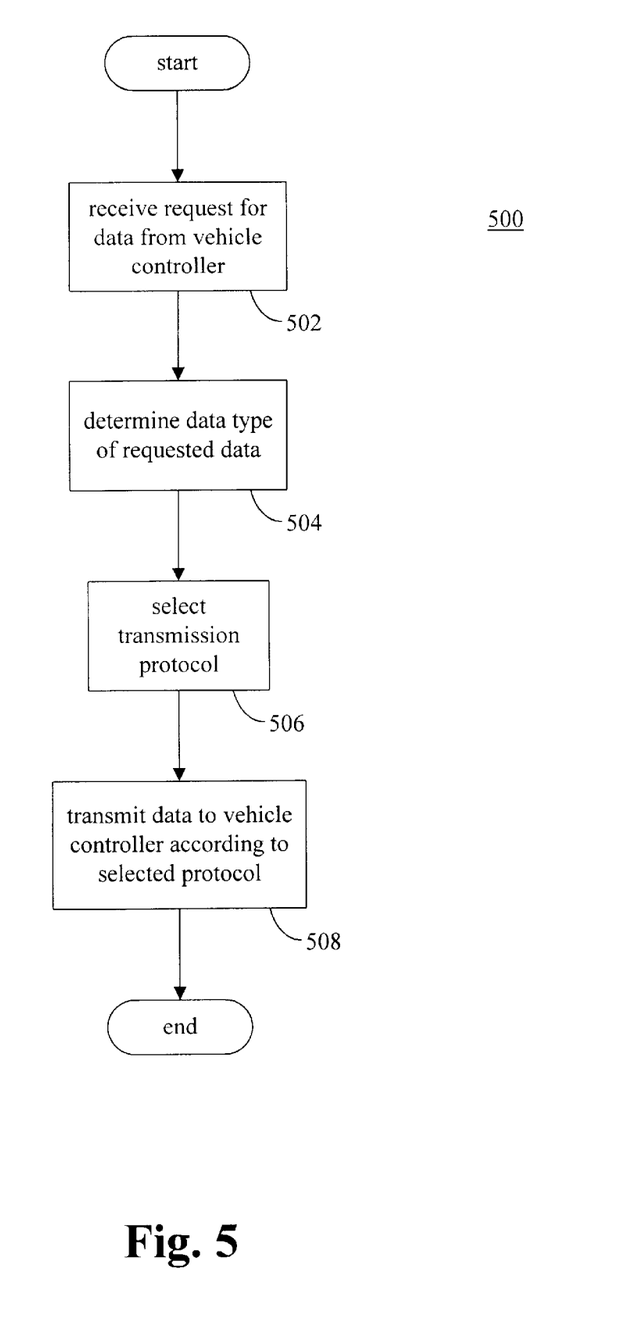
FIG. 5 is a flowchart illustrating transmission of data from a navigation system to a vehicle controller according to a specific embodiment of the invention.

FIG. 5 is a flowchart 500 illustrating transmission of data from a navigation computer to a vehicle controller according to a specific embodiment of the invention. As discussed above with reference to FIGS. 2–4, the vehicle controller controls the user interface through which the user interacts with the navigation computer. When the navigation computer receives a data request from the vehicle controller (502) it determines the data type of the requested data (504). That is, when the user's actions at the user interface necessitate the display of a list of cities or street names, the vehicle controller requests the list data from the navigation computer. Similarly, where the user selects a map display or a route guidance mode, the vehicle controller requests the appropriate graphics screen data. The navigation computer discriminates between these different types.

Based at least in part on the data type requested, the navigation computer selects a data transmission protocol (506) from a plurality of protocols. The requested data are then transmitted to the vehicle controller according to the selected protocol (508). For example, where list data are requested, a specific embodiment of the invention selects a protocol in which enough of the list data are initially sent in a block of contiguous packets to fill some predetermined portion of the display screen in the user interface. In the vehicle navigation environment, list data typically comprise alphanumerically arranged sequences of city, street and point of interest names. According to various embodiments of the invention, the first block transmitted may comprise the first entries in the list. According to other embodiments, the first block of records begin with a record which corresponds to alphanumeric input entered by the user in the user interface. Thereafter, additional contiguous blocks of the list data are sent and buffered in memory associated with the vehicle controller (or the user interface) as dictated by the manner in which the user scrolls through the data or the amount of buffer memory available. According to various embodiments, these additional contiguous; blocks include records preceding and following the first block transmitted.

By contrast, where graphics screen data are requested the entire graphics screen may be transmitted as a block of contiguous data packets. This may be done using any of a variety of well known data compression techniques. Alternatively, as discussed above, generic graphics screens of a variety of types, e.g., a left turn maneuver screen, may be stored in memory associated with the vehicle controller or the user interface. In such an embodiment, the navigation computer transmits ID data identifying the generic screen along with specific screen data, e.g., street name, distance to maneuver, etc. The complete graphics screen is then instantiated in the user interface using the generic screen data and the specific screen data under the control of the vehicle controller.

Figure 6:
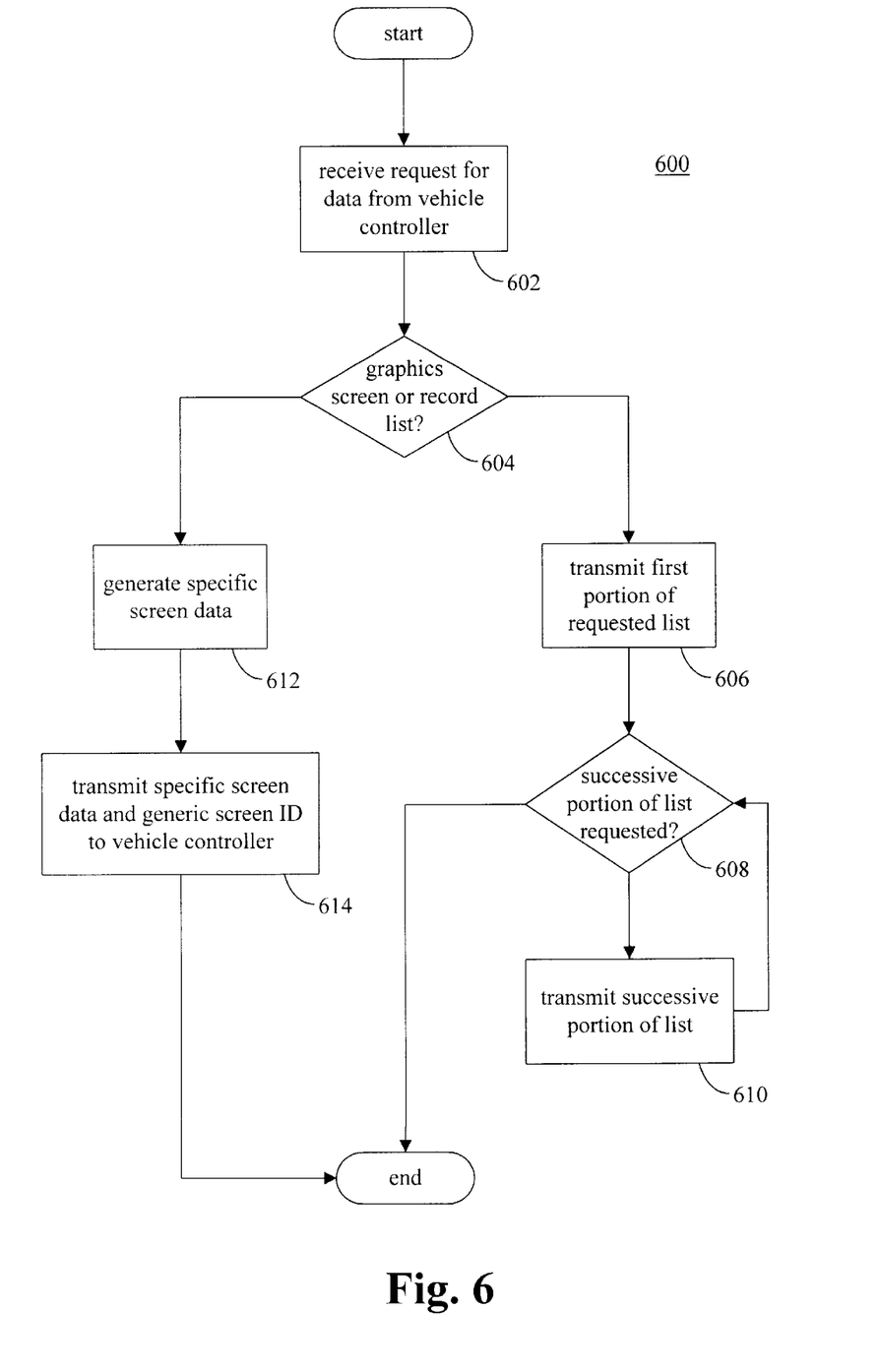
FIG. 6 is a flowchart illustrating transmission of data from a navigation system to a vehicle controller according to another specific embodiment of the invention.

FIG. 6 is a flowchart 600 illustrating transmission of data from a navigation computer to a vehicle controller according to a more specific embodiment of the invention. The embodiment illustrated in FIG. 6 discriminates between list data and graphics data as described above with reference to FIG. 5. When the navigation computer receives a request for data from the vehicle controller (602) it determines whether the requested data are for a graphics screen or a list of records (604) such as, for example, city or street names. Where a record list has been requested, a first portion of the list is transmitted to the vehicle controller as a block of contiguous data packets (604). According to a specific embodiment, the size of the block is determined by the number of records which will fit on the display screen at one time. According to another embodiment, the size of the block is determined with reference to the display screen size and some other factor such as, for example, the amount of buffer memory available, the bandwidth of the data link between the navigation computer and the vehicle controller, the amount of control activity in which the vehicle controller is currently engaged, and the size of the complete record list. Successive portions of the list are transmitted to the vehicle controller as they are requested (608, 610).

Where, on the other hand, graphics screen data are requested (604), the navigation computer generates data which are specific to the screen (612) and transmits the specific data to the vehicle controller along with a generic screen ID (614). As discussed above, the generic screen ID is a data string which identifies a generic screen type the data for which is stored in memory associated with either the vehicle controller or the user interface. The requested graphics screen is then instantiated in the user interface using the specific and generic screen data under the control of the vehicle controller. Examples of graphics screens constructed in this manner include a maneuver instruction screen in which an upcoming maneuver is communicated to the user. If, for example, the upcoming maneuver is a right turn at $1^{st}$ street, the user is presented with a screen having a large, brightly colored right-turn icon along with information regarding $1^{st}$ street and the distance to the intersection. In such a case, the generic screen data include the screen background, any generic formatting (e.g., lines, boxes, etc.), and the turn icon. The specific screen data include the upcoming street name, i.e., $1^{st}$ street, the distance to the intersection, and any appropriate audio messages if the system is voice-enabled.

According to a specific embodiment, once the navigation computer has determined a series of maneuvers for route guidance, the entire series of maneuvers is transmitted to the vehicle controller as a contiguous block using the generic screen IDs and the associated specific screen data.

While the invention has been particularly shown and described with reference to specific embodiments thereof, it will be understood by those skilled in the art that changes in the form and details of the disclosed embodiments may be made without departing from the spirit or scope of the invention. For example, some of the embodiments described above select a transmission protocol based in part on the type of data being requested. It will be understood, however, that additional criteria may be employed for selection of the transmission protocol without departing from the score of the invention. For example, the nature of the request from the vehicle controller may be employed to select the appropriate protocol. That is, rather than the navigation computer internally determining the type of data being requested, the requested data type may be identified by the request itself.

In addition, the appropriate transmission protocol may be determined with reference to the amount of the vehicle controller's memory currently available, the vehicle controller's current level of activity, or a transmission priority level communicated by the controller itself. Therefore, the scope of the invention should be determined with reference to the appended claims.

What is claimed is:

1. A navigation system for operating in a vehicle having a plurality of systems controlled by a vehicle controller, the plurality of systems including a user interface, the vehicle navigation system comprising:

at least one receiver for receiving external data originating outside of the vehicle;

at least one input for receiving vehicle data;

a database medium having map data stored therein;

a central processing unit (CPU) coupled to the at least one receiver, the at least one input, and the database medium, the CPU being for performing navigation functions using the external data, the vehicle data, and the map data;

a communication link coupled to the CPU for transmitting interface data to the vehicle controller;

wherein the CPU selects one of a plurality of transmission protocols to transmit the interface data based, at least in part, on a data type associated with the interface data.

2. The vehicle navigation system of claim 1 wherein the at least one receiver comprises a global positioning satellite (GPS) receiver and the external data comprises GPS data.

3. The vehicle navigation system of claim 1 wherein the at least one receiver comprises an RF receiver and the external data comprises traffic data.

4. The vehicle navigation system of claim 1 wherein the at least one input comprises an odometer input and the vehicle data comprises odometer data.

5. The vehicle navigation system of claim 4 wherein the vehicle has an odometer which is controlled by the vehicle controller, the odometer input being for receiving odometer data from the vehicle controller.

6. The vehicle navigation system of claim 1 wherein the at least one input comprises an angular velocity sensor input and the vehicle data comprises angular velocity data.

7. The vehicle navigation system of claim 1 wherein the communication link comprises a serial data link.

8. The vehicle navigation system of claim 1 wherein the communication link comprises a parallel data link.

9. The vehicle navigation system of claim 1 wherein the CPU selects the one of the plurality of transmission protocols based on a request for the interface data from the vehicle controller.

10. In a vehicle having a plurality of systems controlled by a vehicle controller, the plurality of systems including a user interface and a navigation system, a method for transmitting interface data from the navigation system to the vehicle controller, comprising:

receiving a request from the vehicle controller for the interface data to be presented in the user interface, the interface data having a data type associated therewith;

selecting a first transmission protocol from a plurality of transmission protocols for transmitting the interface data to the vehicle controller the first transmission protocol being selected based, at least in part, on the data type; and transmitting the interface data to the vehicle controller according to the first transmission protocol.

11. The method of claim 10 wherein the first transmission protocol is selected based in part on the request received from the vehicle controller.

12. The method of claim 10 wherein the interface data represents a plurality of records to be displayed in the user interface, transmitting the interface data according to the first transmission protocol comprising:

transmitting a first number of the records as a first sequence of contiguous data packets from the navigation system to the vehicle controller, the first number being determined with reference to a capacity of the user interface to display the records; and thereafter, transmitting additional sequences of contiguous data packets corresponding to additional records from the navigation system to the vehicle controller.

13. The method of claim 12 wherein the plurality of records are arranged in an ordered alphanumeric sequence, the first number of records being the first number of records in the alphanumeric sequence.

14. The method of claim 12 wherein the plurality of records are arranged in an ordered alphanumeric sequence, the first number of records beginning with a first record which corresponds to at least one alphanumeric character entered in the user interface.

15. The method of claim 14 wherein the additional sequences of contiguous data packets include records preceding and following the first record in the alphanumeric sequence.

16. The method of claim 12 wherein the plurality of records comprises city names.

17. The method of claim 12 wherein the plurality of records comprises street names.

18. The method of claim 12 wherein the plurality of records comprises point of interest names.

19. The method of claim 12 wherein at least one of the additional sequences corresponds to a second number of the records, the second number being limited by a memory capacity associated with the vehicle controller.

20. The method of claim 12 wherein a second number of additional sequences are transmitted, the second number corresponding to scrolling activity in the user interface.

21. The method of claim 10 wherein the interface data represents a graphics screen to be displayed in the user interface, transmitting the interface data according to the first transmission protocol comprising transmitting a first sequence of contiguous data packets from the navigation system to the vehicle controller, the first sequence representing the entire graphics screen.

22. The method of claim 21 wherein the graphics screen comprises a maneuver screen for alerting a user of the navigation system of an upcoming maneuver.

23. The method of claim 21 wherein the graphic screen comprises a map display screen representing a map region and having an icon representing the vehicle displayed thereon.

24. The method of claim 10 wherein the interface data represents a graphics screen to be displayed in the user interface, transmitting the interface data according to the first transmission protocol comprising transmitting a first sequence of contiguous data packets from the navigation system to the vehicle controller, the first sequence including identification data for identifying a generic graphics screen stored in memory associated with the vehicle controller, and specific graphics screen data, the generic graphics screen and the specific graphics screen data being combined under control of the vehicle controller to effect display of the graphics screen in the user interface.

25. The method of claim 24 wherein the graphics screen comprises a maneuver screen for alerting a user of the navigation system of an upcoming maneuver.

26. The method of claim 24 wherein the graphic screen comprises a map display screen representing a map region and having an icon representing the vehicle displayed thereon.

27. A computer program product for causing data to be transmitted from a navigation system to a vehicle controller in a vehicle having a plurality of systems controlled by the vehicle controller, the plurality of systems including a user interface and the navigation system, comprising:

a computer-readable medium; and a computer program mechanism embedded in the computer-readable medium for causing a computer to perform the steps of:

in response to a request from the vehicle controller for interface data to be presented in the user interface, the interface data having a data type associated therewith, selecting a first transmission protocol from a plurality of transmission protocols for transmitting the interface data to the vehicle controller, the first transmission protocol being selected based, at least in part, on the data type; and transmitting the interface data to the vehicle controller according to the first transmission protocol.

* * * * *